United States Patent [19]
Agusta et al.

[11] 3,797,000
[45] Mar. 12, 1974

[54] NON-VOLATILE SEMICONDUCTOR STORAGE DEVICE UTILIZING AVALANCHE INJECTION AND EXTRACTION OF STORED INFORMATION

[75] Inventors: Benjamin Agusta, Burlington; Joseph Juifu Chang, Shelburne, both of Vt.

[73] Assignee: International Business Machines Corporation, Armonk, N.Y.

[22] Filed: Dec. 29, 1972

[21] Appl. No.: 319,425

[52] U.S. Cl. .......... 340/173 R, 307/238, 317/235 R
[51] Int. Cl. ........................ H01l 11/14, G11c 11/40
[58] Field of Search ............ 317/235 R; 340/173 R; 307/238

[56] References Cited

UNITED STATES PATENTS

| | | | |
|---|---|---|---|
| 3,500,142 | 3/1970 | Kahng | 340/173 R |
| 3,649,884 | 3/1972 | Haneta | 317/235 |
| 3,660,819 | 5/1972 | Frohman Bentchkowsky | 317/235 |

*Primary Examiner*—Terrell W. Fears
*Attorney, Agent, or Firm*—Francis J. Thornton

[57] ABSTRACT

A non-volatile semiconductor storage device that can be electronically erased can be realized from a double gate field effect transistor having a first and second gates, the first gate being closer to the semiconductor body than the second gate and insulated from the body and the second gate so that it is electrically floating. When the floating gate has a thickness and is biased so that complete depletion can be achieved therein and the thickness and ionization rate product is equal to unity stored information in the form of electrons are expelled therefrom due to the effects of avalanche mechanisms.

10 Claims, 2 Drawing Figures

NON-VOLATILE SEMICONDUCTOR STORAGE DEVICE UTILIZING AVALANCHE INJECTION AND EXTRACTION OF STORED INFORMATION

BACKGROUND OF THE INVENTION

1. Field of the Invention:

This invention relates generally to non-volatile memory storage devices.

More particularly the invention relates to non-volatile semiconductor Field Effect transistors having dual gates one of which is electrically floating and can have charge stored thereon.

2. Description of the Prior Art:

U. S. Pat. Nos. 3,500,142 and 3,649,884 are typical of those patents that disclose dual gate FET's in which one gate is electrically floating and acts as a storage medium. These patents teach that such gates can be electrically charged and discharged only if the insulating layer between the floating gate and the substrate of the transistor is thin enough to permit tunneling of electrons there through. Such thin insulating layers have serious drawbacks associated therewith.

U. S. Pat. No. 3,660,819 describes a single floating gate FET using an insulating layer which is so thick as to prevent tunneling action. This device was designed to overcome the disadvantages of the devices taught in U. S. Pat. Nos. 3,500,142 and 3,649,884. However this patent teaches that such a floating gate can be discharged only by ultraviolet light, x-rays or temperatures in excess of about 450°C. Because of this drawback such devices are primarily used only as Read only memories because in all practical applications, once charged the floating gates cannot be discharged. In Electronics, Sept. 27, 1971, it was suggested that such floating gates when charged with electrons could be discharged by injecting holes into the gate from the substrate to cancel the accumulated electrons and erase the memory. Such erasure by hole injection is not only difficult but because of the characteristics of the holes it is also slow.

SUMMARY OF THE INVENTION

It is an object of the invention to provide a semiconductor device that is non-volatile and in which digital information can be stored.

It is a further object of the invention to provide a semiconductor memory cell that is easily fabricated and is comparable with present solid state circuit technologies and techniques.

It is another object of the invention to provide a floating gate transistor which can have information electronically stored therein and removed therefrom.

The present invention, in its preferred form comprises a floating gate Field Effect Transistor device having a substrate of a first conductivity type and a pair of diffused source and drain regions of the opposite type therein such that FET type conduction can occur therebetween. Stacked gates are disposed between these regions and insulated therefrom and from one another by thick insulating layers. One gate is substantially surrounded by the insulating layers and the other gate is disposed over the first gate and insulated therefrom. Electrical contacts are made only to the substrate, the diffused source and drain regions and the second gate. The first gate is left unconnected and thus is electrically floating with respect to the remainder of the device.

An electrical charge is placed on the floating gate by applying a voltage of a sufficient magnitude between one of the diffused regions and the substrate such that an avalanche breakdown condition between the biased diffused region and the substrate will occur. This breakdown will cause charges, to be emitted from the substrate with an energy sufficient to cause them to be excited into the conduction bond of the insulative layer separating the substrate from the floating gate such that they flow therethrough to charge the floating gate. When the substrate is N-type and the source and drain regions P-type, the charges will be electrons.

This electrical charge deposited on the floating gate may be removed from the floating gate by biasing the substrate with respect to the second gate such that complete depletion, and thus avalanche breakdown will occur in the charged floating gate. This causes the electrons stored in the floating gate to be expelled therefrom. This information written into the floating gate by the storage of electrons can be electronically erased.

The foregoing and other features, advantages and objects of the present invention will be apparent from the following detailed description of a preferred embodiment of the invention as illustrated in the accompanying drawing.

DESCRIPTION OF THE PREFERRED EMBODIMENT

Figure 1:
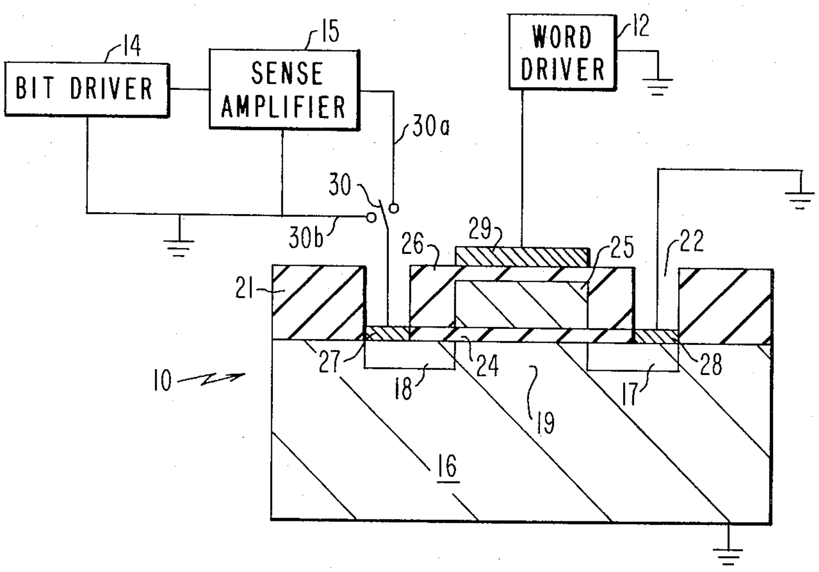
FIG. 1 illustrates a cross-section of a floating gate FET used as a storage cell.
Figure 2:
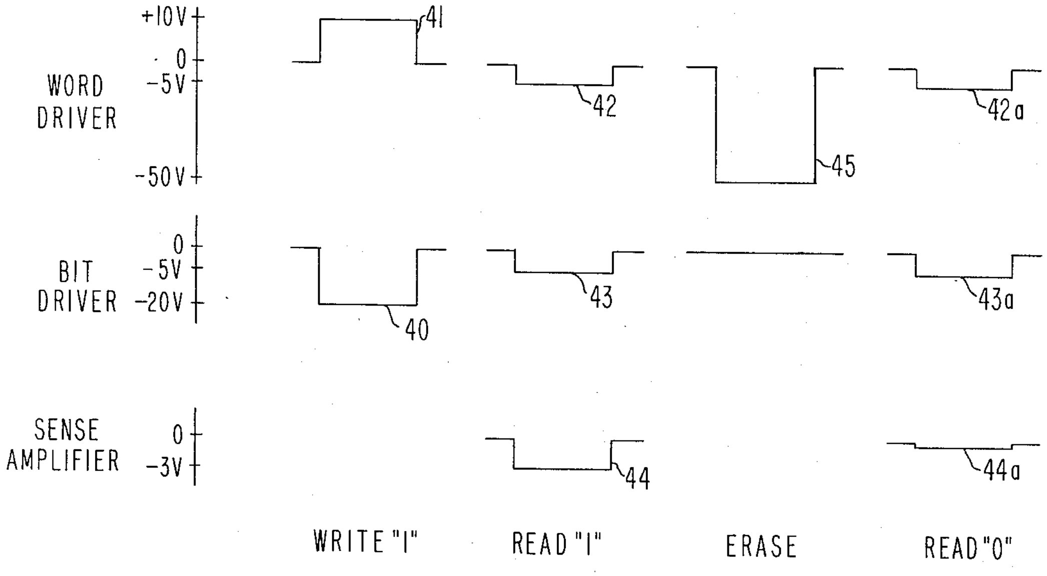
FIG. 2 illustrates the voltage pulses required to read, write, and erase the device shown in FIG. 1.

Referring now to the drawing more particularly to FIGS. 1 and 2, the principles of the inventive concepts of the present invention as contained in one embodiment will be described in detail.

For purposes of illustration only, FIG. 1 shows a single semiconductor Field Effect Transistor (FET) 10, acting as a storage cell, coupled to operational circuits such as a word driver 12, a bit driver 14 and a bit sense amplifier 15.

The word driver 12, the sense amplifier 15 and the bit driver 14 are all conventional. Both the word driver 12 and the bit driver 14 must have the capability of providing voltage potentials of different levels.

The cell 10 preferably is formed of a body 16 of homogeneous elementary semiconductor material having a diffused source 17, and a diffused drain 18, each of a conductivity type opposite to that of the body 16, separated from each other by a region 19. For purposes of illustration only, it will be assumed that the body 16 is formed of N-type silicon of preferably 1.0 to 2.0 ohm-centimeter material; and, P-type dopants are used to form diffusions 17 and 18. Overlying the surface of the body is an insulating layer 21. This layer 21 may be, for example, composed of silicon dioxide formed by conventional techniques and having a thickness of approximately 8,000 Angstroms. This layer 21 is modified by known and conventional methods; such as, etching and oxide regrowth to create an opening 22 in the oxide 21 and reform, by standard known techniques, over the region 19, a first oxide layer 24, having a thickness such that with normal operating voltages tunnelling cannot occur. For most FET devices this gate thickness is in the order of 500 Angstroms or more.

After formation of this first oxide layer 24, a gate electrode 25 which consists of a semiconductor material which upon application of suitable fields thereto will be totally depleted of free carriers is formed over the gate oxide 24. Once this gate 25 is formed it is encapsulated in a second layer 26 of appropriate insulating material, so as to electrically isolate gate 25 so that it can float electrically with respect to the remainder of the device.

For convenience, the layer 26 can be of the same type material as layer 24 and the thickness would also be of the same magnitude. Of course, composite insulating layers can also be used here.

Subsequently, appropriate electric contacts 28 and 27 are provided to the source and drain diffusions 17 and 18, respectively, and a metallic gate electrode 29 hereinafter referred to as the drive gate is formed over the electrically isolated gate 25, hereinafter referred to as the floating gate but is isolated therefrom by the insulating layer 26.

Various methods and techniques of forming the layers, gate oxides, electrodes, diffusions, etc., are well known to those familiar with the semiconductor art and a specific description is not intended to limit the invention since other techniques could be used.

The drain electrode 27 is coupled through a first switch 30 to the sense amplifier circuit 15 and the bit driver 14. The switch 30 is a two position switch operative to either connect the drain electrode 27 to the sense amplifier 15 and bit line driver 14 via lead 30*a* or to ground via lead 30*b*. The source electrode 28 as well as the substrate 16 are both connected to ground. The drive gate 29 is connected to the word driver 12.

Because the floating gate 25 is electrically floating, it can be made to contain an excess quantity of charge and thus act to create, by induction, a channel in the region 19 between the source and drain diffusions 17 and 18. The presence of such a channel can be used to represent a 1 in binary language. When such charges are not present in the floating gate 25 a channel does not exist in the region 19. The absence of such a channel thus represents a 0 in binary language. By creating or extinguishing such channels in the device, the described FET can be used as a memory cell.

As noted above, FIG. 2 illustrates the pulses required to read, write and erase the memory cell of FIG. 1.

When a 1 is to be written into the memory cell so that a channel will be induced between the source and drain, the switch 30 is coupled to the lead 30*a* so that the bit driver 14 and sense amplifier 15 are both directly connected to the drain electrode 27. The bit driver 14 is driven to set the voltage on drain electrode 27 at −20 volts to cause the diffused region 18 to be back biased. This bit drive voltage is represented in FIG. 2 by pulse 40. Simultaneously, the gate electrode 29 is pulsed positive by the word driver 12. This is indicated by pulse 41 in FIG. 2. The coincident application of both these voltage pulses 40 and 41 must be sufficient to cause avalanche breakdown to occur between the drain region 18 and the substrate 16 in the vicinity of the region 19. When such avalanche breakdown occurs in the described device high energy electrons are generated beneath floating gate 25 and caused, under the influence of the applied electric voltages to pass into layer 24 and thence to the floating gate 25 where they accumulate and are stored.

The electrons so injected into the oxide layer 24 are driven onto the floating gate 25 because of the electric fields created in the device by the applied voltages. Any charge so injected into the floating gate 25 will of course remain there for extremely long periods of time.

After the pulses 40 and 41 terminate the accumulated electrons within the floating gate 25 cause an induced channel to exist between the source diffusion 17 and the drain diffusion 18. The existence or non-existence of aa charge on the floating gate 25 may thus be determined by ascertaining the existence or non-existence of such a channel. This is accomplished by applying comparatively low level coincident read pulses 42 and 43 to the drain electrode 27 and the drive gate electrode 29. The total voltage of such coincidence pulses, of course, must be less than that required to cause avalanche breakdown and injection. Thus a 5 volt pulse 42 to the drive gate 29 and together with a simultaneous 5 volt pulse 43 to the drain electrode 27 will suffice to detect the presence or absence of a channel but will not be enough to cause an ejection of charge onto the floating gate 25. The presence of a charge is indicated by a pulse 44, about on the order of 3 volts, appearing on the sense amplifier 15.

To remove the charge from the floating gate 25 and thus eliminate any induced channel in the region 19 the switch 30 is coupled to ground, i.e., held at zero volts by switching it to contact lead 30*b*. Simultaneously a relatively large negative pulse 45 is applied from the word driver 12 to the drive gate 29. The electric field set up in the floating gate 25 by this large applied pulse voltage must, in accordance with the teaching of this invention be sufficient to totally deplete the floating gate 25 and cause all the excess stored charges therein to be injected by avalanche breakdown out of the floating gate into the underlying region 19. When the layers 24 and 26 are formed of silicon dioxide and are about 1,000 angstroms thick and the floating gate 23 is 10,000 angstroms thick and formed of silicon, a field of $3 \times 10^5$ volts per centimeter sufficient to cause such a condition can easily be established in the floating gate 25 by application of a 50 volt pulse indicated by pulse 45 in FIG. 2.

Generally speaking, it is preferred that the floating gate 25 be comprised of a semiconductor material having a thickness and a doping concentration therein which has a product less than $3 \times 10^{12}$ impurity atoms/cm$^2$. This permits a maximum voltage drop to be achieved the floating gate 25 so that the floating gate 25 can be totally depleted by a pulse applied to the drive gate 29 that will not cause breakdown of the dielectric layers 24 and 26 and yet will cause the electrons stored in the floating gate to be ejected therefrom into the underlying substrate.

During the erase operation the voltage applied to the floating gate as shown by the single pulse 45 can be in the form of a series of extremely short time pulses instead of a single long pulse. The use of such short time pulses in place of a single long pulse avoids mobile charge buildup at the poly-silicon dioxide interfaces and aids in the efficiency of the erase operation. Such mobile charge buildup is of course undesirable since it can reduce the field in the floating gate 25 and increase the field in the insulating layers 24 and 26.

When the device is erased, no charge remains within the floating gate 25 thus there is no channel induced in region 19 and a binary 0 has been stored in the device. Such a 0 is read in exactly the same manner in which a 1 was read, i. e., as indicated previously a 5 volt pulse 42*a* is applied to the drive gate 29 and a 5 volt pulse 43*a* is applied to the drain electrode 27. When a no charge is accumulated within the floating gate 23 no channel exists and thus only leakage currents as indicated by the very small voltage pulse 44*a* is detected by the sense amplifier 15.

As noted in FIG. 2, the pulse 44*a* is substantially zero volts and thus is significantly smaller than the pulse 44, which is usually about −3V, which was obtained in the sense amplifier when a 1 was contained within the device.

Although the operation in the device has been described in conjunction with ejection of hot electrons into and from the floating gate 25 it should be understood that it is also possible to eject holes in the same manner. The effect of course, in either case, is to store information in the floating gate. However, it is harder to eject such holes than it is to eject electrons. Additionally, the electron ejection in both directions is approximately three orders of magnitude faster than hole ejection. Thus a completely electrical programmable MOS memory device has been described.

While the invention has been particularly shown and described with reference to the preferred embodiment thereof, it will be understood by those skilled in the art that various changes in form and details of the apparatus and methods may be made therein without departing from the spirit and scope of the invention and that the method is in no way restricted by the device.

What is claimed is:

1. An insulated, double gate, field effect transistor storage device that can have information electrically stored therein and electrically removed therefrom comprising

- a semiconductor substrate of one conductivity type,
- a source region and a drain region of opposite conductivity type formed in said substrate,
- said source region being spaced apart from said drain region,
- a first insulating layer on said substrate intermediate said source region and said drain region,
- a first gate electrode composed of a semiconductor material having a thickness and impurity concentration therein which has a product less than $3 \times 10^{12}$ impurity atoms/cm$^2$, overlying said insulating layer,
- a second gate electrode overlying said first gate electrode and
- an insulating layer between said first and second gate electrodes electrically isolating said first and second gate electrodes.

2. The device of claim 1 wherein

- said first gate electrode has a thickness approximately one order of magnitude greater than the thickness of the first insulating layer.

3. The device of claim 1 wherein said first insulating layer is silicon dioxide and said first electrode is silicon.

4. The device of claim 1 wherein said first gate electrode is polycrystalline semiconductor material.

5. The device of claim 1 wherein said second gate is semiconductor material.

6. The device of claim 3 wherein said first insulating layer has a thickness in the order of hundreds of Angstroms and said first gate electrode has a thickness in the order of thousands of Angstroms.

7. A memory storage system that can have information electrically stored therein and electrically removed therefrom comprising,

- a semiconductor substrate of one conductivity type,
- a source region and a drain region of opposite conductivity type formed in said substrate,
- said source region being spaced apart from said drain region,
- an electrode connected to said source region,
- an electrode connected to said drain region,
- a first insulating layer on said substrate intermediate said electrodes,
- a first gate electrode composed of a semiconductor material having a thickness and impurity concentration therein which has a product less than $3 \times 10^{12}$ impurity atoms/cm$^2$ disposed on said first insulating layer,
- a second gate electrode overlaying said first gate electrode,
- a second insulating layer between said first and second gate electrodes to electrically isolate said first gate electrode from said second gate electrode,
- means for coupling the source diffusion, the drain diffusion and the substrate to ground, and
- means for applying a voltage pulse to said second gate electrode sufficient to achieve complete depletion in said first gate electrode and to expell stored charges therefrom through said first insulating layer into said substrate.

8. The system of claim 7 wherein said first gate electrode is polycrystalline.

9. The system of claim 8 wherein said first and second gate electrodes are silicon and said insulating layers are silicon dioxide.

10. The system of claim 9 wherein said first gate electrode has a thickness in the order of thousands of Angstroms and said first insulating layer has a thickness in the order of hundreds of Angstroms.

* * * * *